United States Patent [19]

McCluney

[11] Patent Number: 5,322,409
[45] Date of Patent: Jun. 21, 1994

[54] HARVEST MACHINE WITH WORKER SUSPENSION SLINGS HAVING LONG LENGTH AND CONVERGING SUPPORTS FOR FREE LATERAL MOVEMENT

[76] Inventor: Michael McCluney, 28 Morehouse Dr., La Selva Beach, Calif. 95076

[21] Appl. No.: 838,037

[22] Filed: Feb. 20, 1992

[51] Int. Cl.$^5$ .................. A01D 46/00; A01D 67/04; A01D 45/00
[52] U.S. Cl. .................................. 414/528; 280/32.5
[58] Field of Search .................... 244/900, 151 R; 56/327.1, 328.1; 280/32.5; 414/527, 528

[56] References Cited

U.S. PATENT DOCUMENTS

| | | | |
|---|---|---|---|
| 1,370,347 | 3/1921 | Nelson | 280/32.5 |
| 1,687,948 | 10/1928 | Olsen | 280/32.5 |
| 2,317,606 | 4/1943 | Harris | 280/32.5 |
| 2,378,143 | 6/1945 | Jensen | 280/32.5 |
| 2,378,847 | 6/1945 | Harris | 280/32.5 X |
| 2,805,075 | 9/1957 | Fladung | 280/32.5 |
| 3,351,151 | 11/1967 | Miller, Jr. et al. | 280/32.5 X |
| 3,361,224 | 1/1968 | McKim | 280/32.5 |
| 3,740,066 | 6/1973 | Gieringer et al. | 280/32.5 |
| 3,761,082 | 9/1973 | Barthel, Jr. | 244/151 R X |
| 3,995,799 | 12/1976 | Bartolini | 244/900 X |
| 4,395,186 | 7/1983 | Whyte | 280/32.5 |
| 4,410,175 | 10/1983 | Shamp | 244/151 R X |
| 4,526,248 | 7/1985 | Johansen | 280/32.5 |
| 4,796,903 | 1/1989 | Procter et al. | 280/32.5 X |
| 4,860,970 | 8/1989 | Roselli | 244/900 X |

*Primary Examiner*—Michael S. Huppert
*Assistant Examiner*—James T. Eller, Jr.
*Attorney, Agent, or Firm*—David Pressman

[57] ABSTRACT

A harvest machine comprises a chassis (10) having wheels (15) attached to its sides. A vertical frame (11) is attached near the rear of the chassis. Slings (18) and a harness or body support (40) hang from the vertical frame to suspend workers (20) in prone positions over low plants (21). The slings allow the workers to easily move about to reach plants around them without bending, kneeling, or any posture that creates back strain. A packing box (19) placed adjacent the workers collect the produce. Alternatively, a conveyor belt (36) may be used to automatically carry produce from the workers into a large packing box (35). The distal end of an arm (14), which extends from the front of the chassis, is connected to the tow bar (23) of a towing vehicle. Alternatively, a motor (30) may be fitted to a nose wheel (33) at the front the chassis to provide self-propulsion. A "boat" (31) at the distal end of an arm (32) attached to the nose wheel rides in a furrow to guide the harvest machine.

16 Claims, 7 Drawing Sheets

HARVEST MACHINE WITH WORKER SUSPENSION SLINGS HAVING LONG LENGTH AND CONVERGING SUPPORTS FOR FREE LATERAL MOVEMENT

BACKGROUND

1. Field of Invention

This invention relates generally to machines for produce harvesting, specifically to a device which enables workers to manually harvest produce more easily.

2. Prior Art

Many types of produce are harvested by workers who walk along the rows of plants to pick the desired fruits or vegetables. Plants that are low to the ground, such as strawberries, require workers to bend over while walking and picking. Such a contorted posture causes great discomfort to the workers, and even serious back injuries to some workers. As a result, the productivity of the workers falls, which combined with the cost of treating back problems, increases the overall cost of produce harvesting.

A number of devices have been designed to improve the worker's posture while harvesting. U.S. Pat. Nos. 2,378,143 to Jensen (1945), and 2,805,075 to Fladund (1957) show devices which support workers in kneeling positions to place them lower to the plants. However, the workers must still bend to reach very low plants. U.S. Pat. No. 3,351,151 to Miller and Johnson (1967) shows a machine which supports workers in low seats to place them even lower to the plants, but still not low enough to eliminate bending.

U.S. Pat. Nos. 2,317,606 to Harris (1943), 3,361,224 to McKim (1968), 4,395,186 to Whyte (1983), 4,526,248 to Johansen (1985), and a New York Times article (Sep. 7, 1955) show devices with platforms or beds which support workers in prone positions very close to the plants. This type of machine allows workers to pick produce without any bending at all. However, the fixed platforms and beds do not allow workers sufficient freedom of movement. Workers have to constantly shift positions on the beds to reach plants on around them. Constantly shifting one's body on a fixed platform can quickly becomes almost as tiring as bending over.

Some of these devices are propelled by the workers themselves, and some have simple boxes for holding the harvested produce. However, in all devices the workers either have to bend over, causing severe back strain, or sit or lie prone and stretch or twist their bodies to reach the produce, causing back and other types of body injuries.

OBJECTS AND ADVANTAGES

Accordingly, several objects and advantages of the invention are to provide a device which will support harvesting workers at the level of the plants, which will allow workers to move about in their supports with great ease to reach for plants, which does not require workers to propel themselves, which can guide itself between rows of plants, which can carry away and store harvested plants more efficiently, which is more comfortable for the workers, and which does not cause backstrains or other body injuries.

Further objects and advantages will become apparent from a consideration of the ensuing description and the accompanying drawings.

DRAWING FIGURES

FIG. 1 is an isometric view of a towed harvest machine in accordance with the invention with worker suspension slings.

FIGS. 2A, 2B, and 2C are side, top, and front views, respectively, of another embodiment of the harvest machine in accordance with the invention with worker suspension slings and which is self-propelled by a motor, and which has a motorized produce conveyor.

DRAWING REFERENCE NUMERALS

| | |
|---|---|
| 10 Chassis | 11 Vertical Frame |
| 12 Crossbar | 13 Brace |
| 14 Arm | 15 Wheel |
| 16 Platform | 17 Chain |
| 18 Sling | 19 Packing Box |
| 20 Worker | 21 Plants |
| 22 Furrows | 23 Tow Bar |
| 30 Motor | 31 Boat |
| 32 Arm | 33 Nose Wheel |
| 34 Rectangular Frame | 35 Packing Box |
| 36 Conveyor Belt | |
| 40 Harness | 41 Ropes |
| 42 Straps | 43 Shoulder Straps |
| 44 Main Portion of Harness | 45 Leg Loops |

DESCRIPTION—FIG. 1—TOWED HARVEST MACHINE

Figure 1:
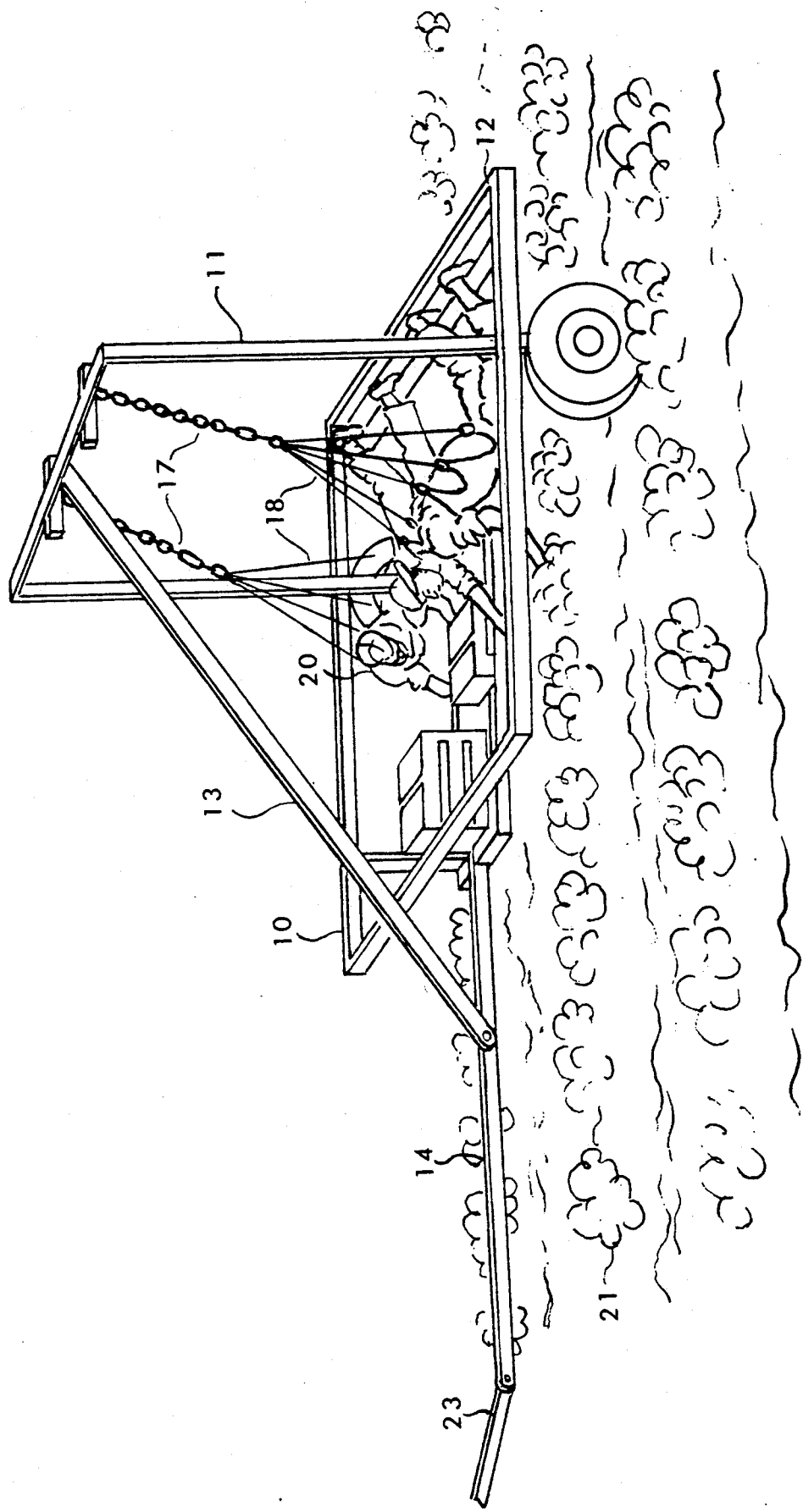

The embodiment shown in FIG. 1 is a tractor-towed harvest machine with slings 18 for suspending workers 20 in prone positions very close to rows of plants 21, such as strawberries. Slings 18 allow workers 20 ease of movement for reaching plants 21 around them.

The harvest machine comprises a horizontal rectangular chassis 10, near the rear portion of which is attached a vertical rectangular frame 11. A diagonal brace 13 extends between the top middle portion of vertical frame 11 and the front middle portion of the chassis 10. A long narrow platform 16 is attached longitudinally to the center of the chassis 10 below the plane of the chassis. Produce packing boxes 19 are placed on platform 16. A crossbar 12 is attached transversely to the rear of the chassis 10 and spaced slightly forward of the rear side of the chassis. A long arm or thill 14 extends from the front of chassis 10. The distal end of arm 14 is connected to a tow bar 23 of a motor vehicle, such as a tractor (not shown). Two wheels 15 are disposed at the lower sides of the vertical frame 11 such that they ride in the furrows 22 on the ground. Two slings 18 are suspended side by side on long chains 17 from attachment points at the top of the vertical frame 11. Slings 18 are separated by the same distance that separates the rows of plants 21 in the field.

The torsos of workers 20 are suspended in prone positions on slings 18 very close to the plants 21, while their feed are hooked over crossbar 12. The harvest machine is towed along the rows of plants 21 such that suspended workers 20 are carried over plants 21 to harvest them. Long chains 17 which suspend slings 18 allow the workers 20 to swing about freely in a horizontal plane to reach plants 21 or boxes 19 by pushing their bodies with their arms or their legs. The slings are adjustable in length so that the heights of the prone workers can be set to the most comfortable position. Such an adjustment is made by adjusting the length of chain 17 or sling 18, which has adjustable strips. Also the workers' shoulder straps are adjustable so that the workers' upper bodies can be raised slightly, a preferred posture, or even lowered if desired.

In operation, the tractor (not shown) tows chassis 10 with suspended workers 20 along the rows of plants at a slow enough speed, as directed by workers 20, so that the workers can pick all of the fruit from the plants. The workers can easily swing themselves out to reach fruit on the far side of plants 21, or in to reach fruit which is close to or adjacent to the workers. After picking the fruit, the workers can easily and conveniently place it in boxes 19 on platform 16, again without twisting or bending.

In one embodiment chassis 10 was 2.5 m wide and 2.5 m long. The frame was 3 m high and chains 17 were 1.5 m apart. Crossbar 12 had a convexly curved and padded upper surface and could pivot on its axis for maximum worker comfort.

FIG. 2A TO 2C—SELF-PROPELLED HARVEST MACHINE

Figure 2A:
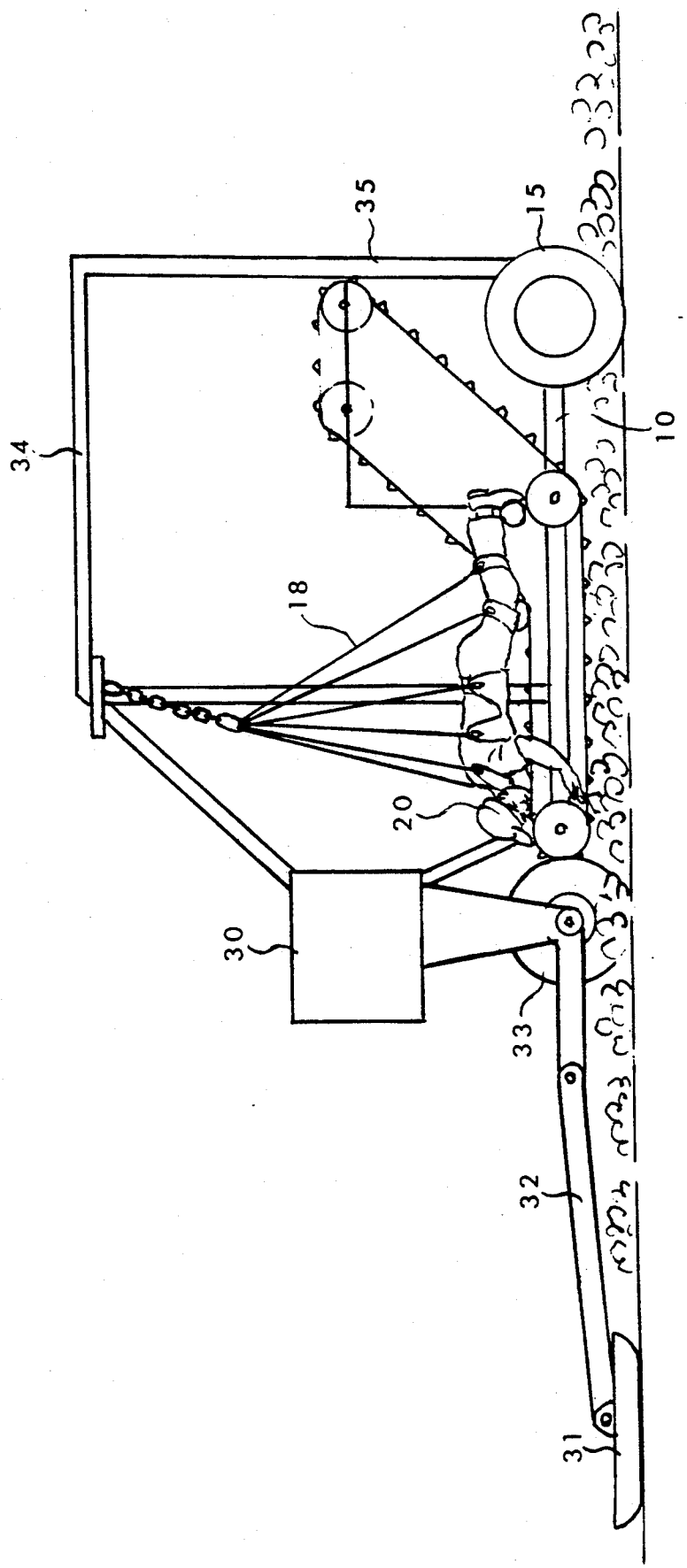
Figure 2B:
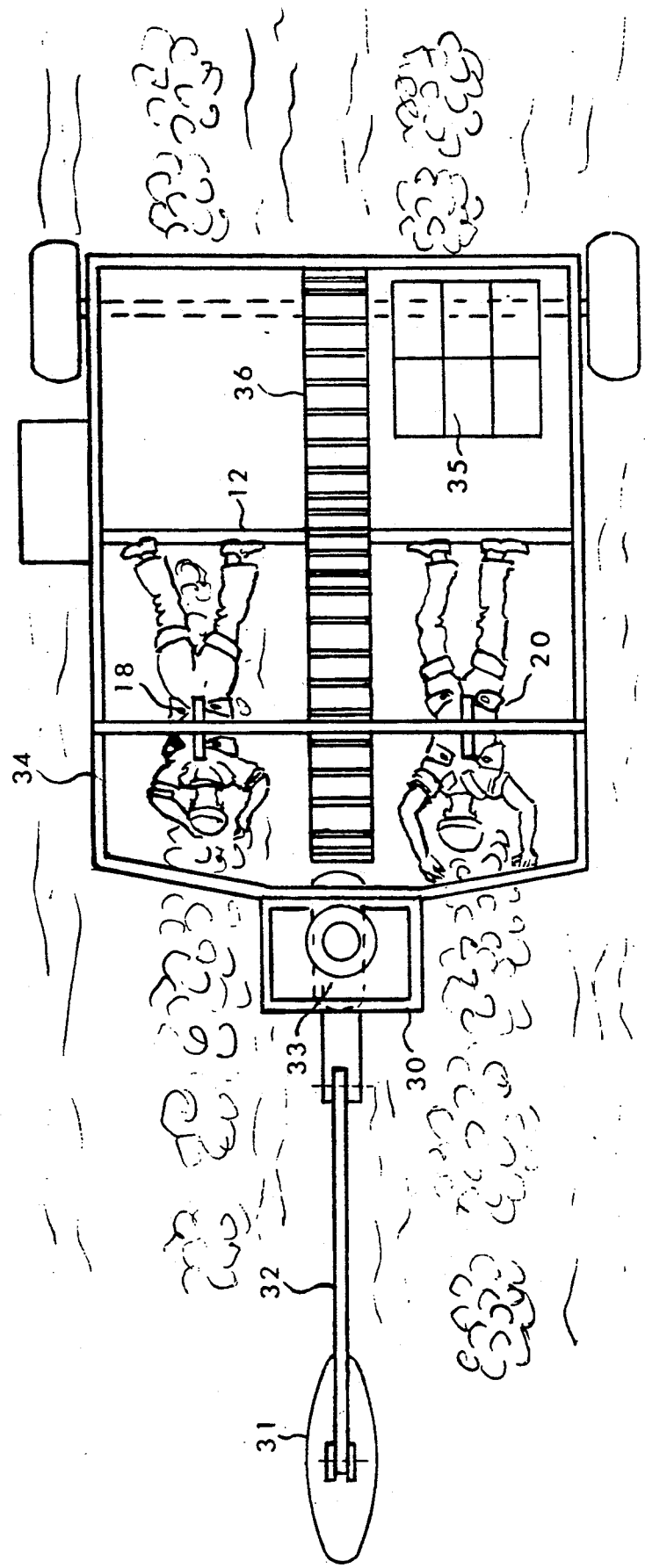
Figure 2C:
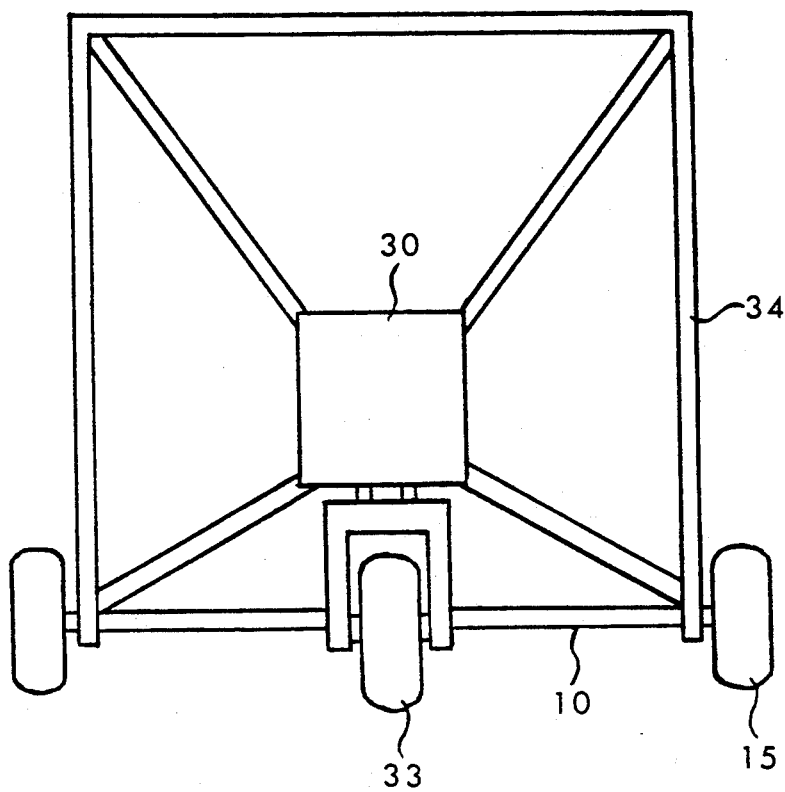

The embodiment shown in FIGS. 2A to 2C is similar to that of FIG. 1, but with the addition of a motor 30 and nose wheel 33 to propel the machine, and a motorized conveyor belt 36 to carry the produce to a packing box 35.

Referring to FIG. 2A, the machine comprises a horizontal rectangular chassis 10'. A vertical, rectangular frame 34 is attached to chassis 10', extending from near the front portion of the chassis to flush with the rear portion of the chassis. Two wheels 15 are attached to the rear side portions of chassis 10' such that they ride in furrows 22 on the ground. As shown in FIG. 2B, two slings 18 are suspended side by side from the top front portion of the rectangular frame 34. Crossbar 12 extends between the mid-sides of chassis 10'. A motorized and vertically slanted conveyor belt 36 is positioned longitudinally along the center of chassis 10'. Belt 36 extends between the front end of chassis 10' and the top of a packing box 35 placed at the rear portion of the chassis. Referring back to FIG. 2A, a steerable nose wheel 33 is attached to the front of chassis 10' with appropriate hinges. The nose wheel 33 is connected to an overhead drive motor 30. Nose wheel 33 is also hingably connected to a long arm or thill 32. The distal end of arm 32 is hingably connected to a "boat" 31, which is elongated and curved with smooth sides like a rowboat.

Drive motor 30 turns nose wheel 33 to propel the machine. Boat 31 rides in and follows the furrow to steer nose wheel 33 via arm 32. The entire machine is thus guided down the rows of plants automatically.

The torsos of workers 20 are suspended in slings 18 very low to the ground, while their feet are hooked over crossbar 12. They may move around very easily to reach plants around them by swinging about in the slings 18. After harvesting the produce, workers 20 place them on the adjacent motorized conveyor belt 36, which carries the produce up and into the packing box 35. A third worker (not shown) may stand or sit adjacent box 35 to pack the fruit properly in box 35.

FIGS. 3A AND 3B—DETAIL OF SUSPENDED WORKER

Figure 3B:
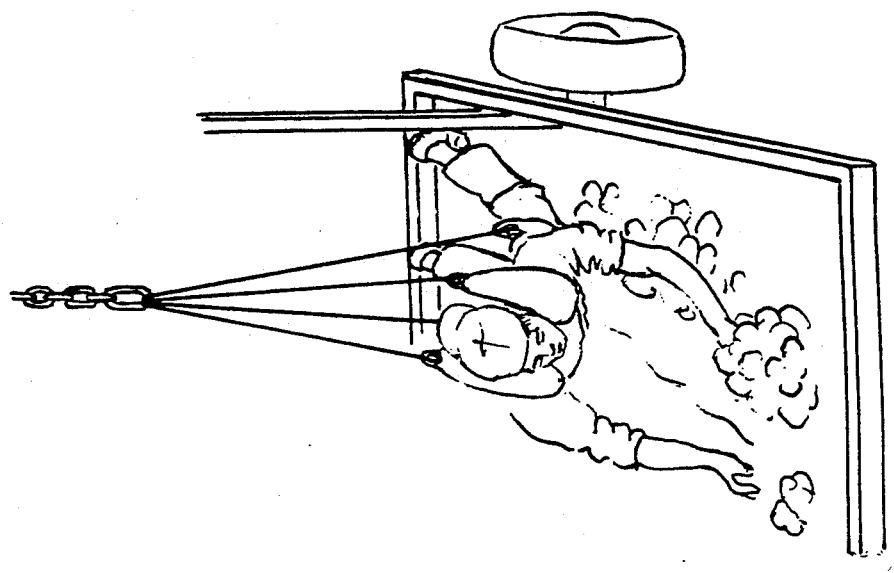
FIGS. 3A and 3B are detailed rear and front perspective views, respectively, of the sling suspended worker.
Figure 3A:
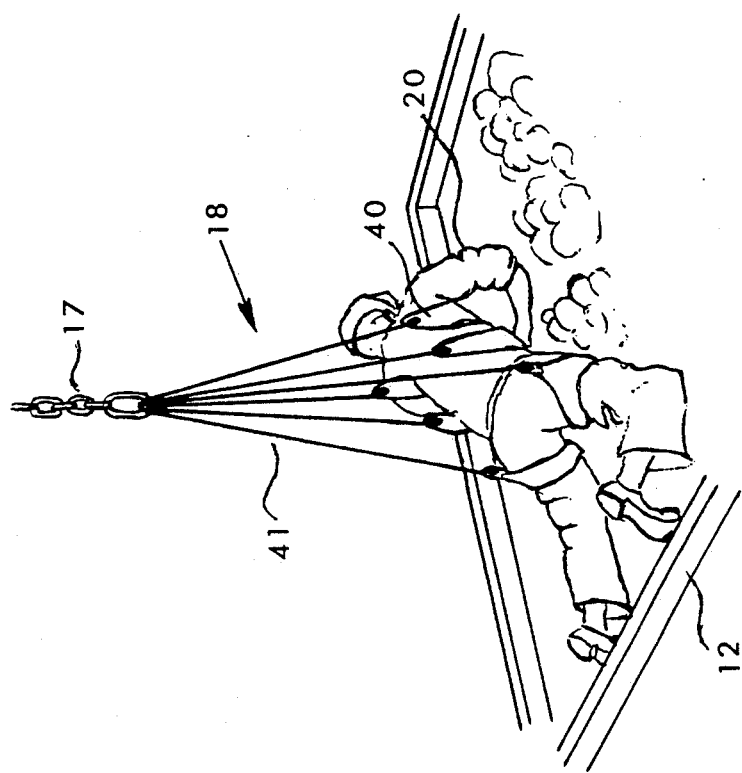

Referring to FIGS. 3A and 3B, a worker 20 is shown harvesting produce while suspended on a sling 18, very close to low plants 21 on the ground. The lower end of chain 17 is attached to the harness 40 of sling 18 through long ropes 41 at six attachment points, two at each side of the torso and one at each shoulder. Worker 20 engages his feet on crossbar 12 for support. Also, by pushing against crossbar 12 with his legs, worker 20 may swing about to reach plants 21 with ease. As indicated the height at which worker 20 is suspended can be adjusted by chain 17 and sling 18. Also the prone angle of the worker can be adjusted by adjusting the shoulder straps.

FIGS 4A AND 4B—DETAIL OF SLING

Figure 4A:
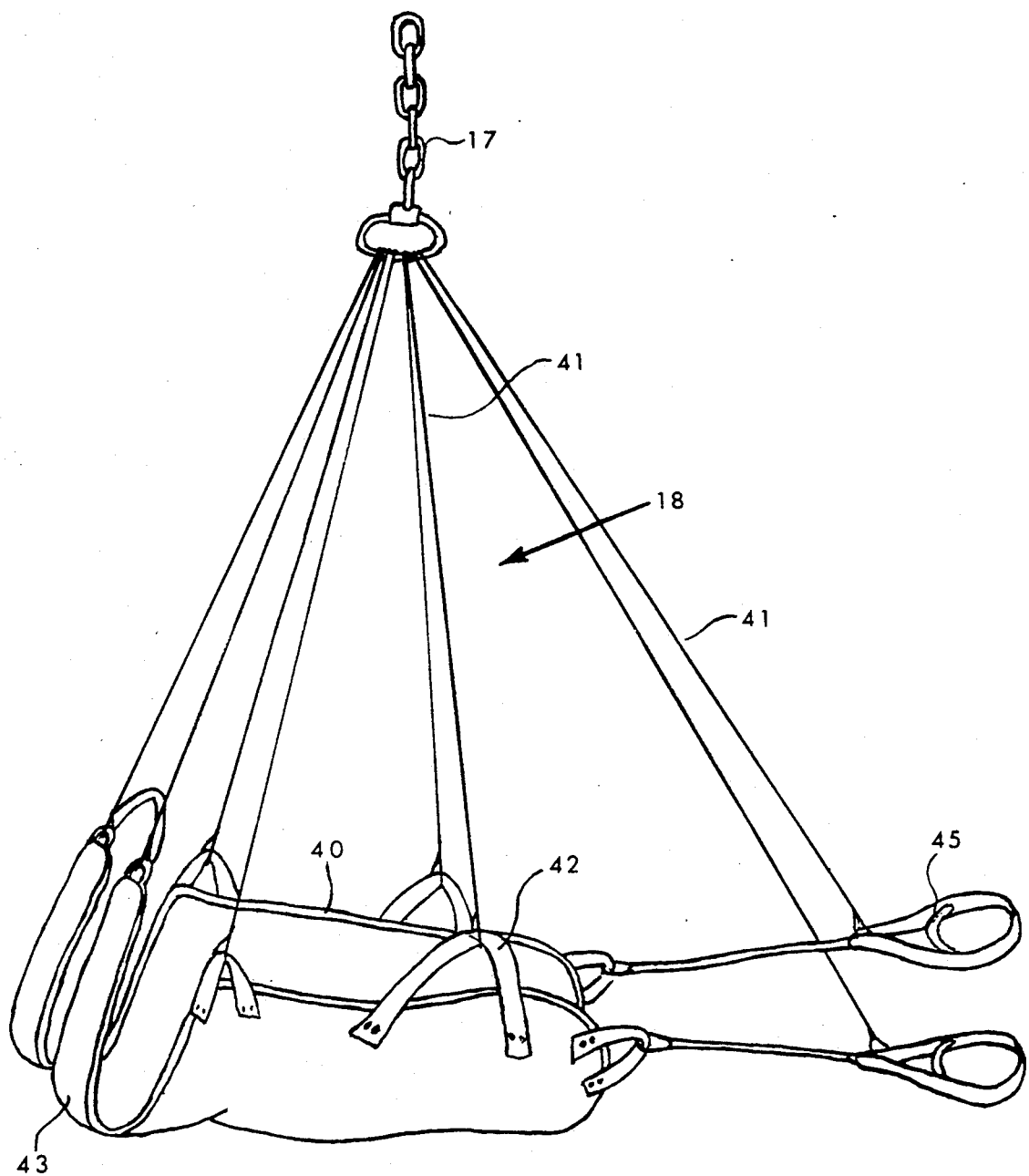
FIGS. 4A and 4B are detailed side perspective and plan views, respectively, of the sling.
Figure 4B:
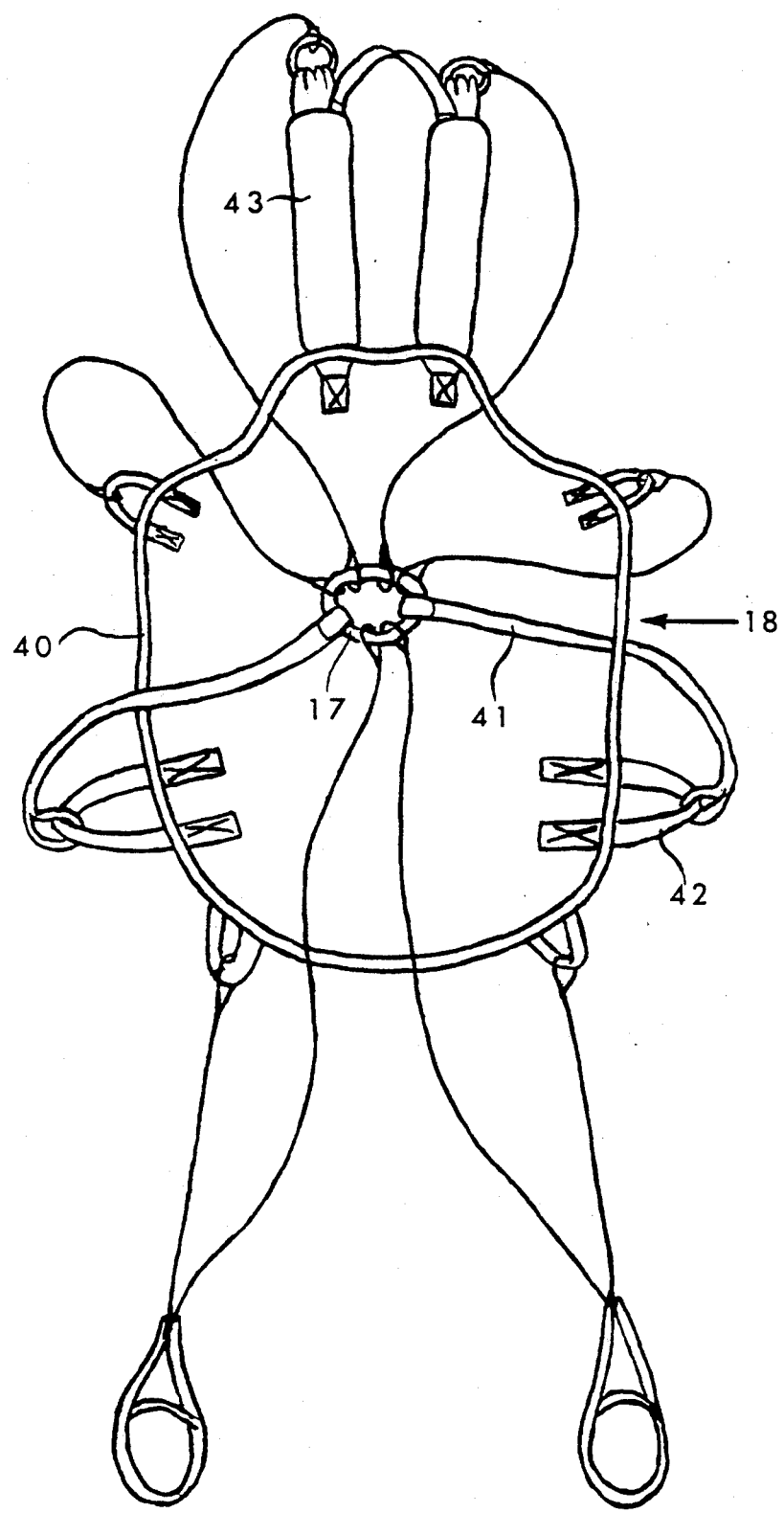

FIG. 4A shows a side view of sling 18. Sling 18 comprises a canvas or leather torso support or harness 40, such as those used in hang gliders. It wraps around the front of worker's torso, and is generally a rectangular flexible sheet with projecting strap attachment points as indicated. Referring to FIG. 4B, a top view of sling 18, two straps 42 are attached to each side of harness 40 near the forward and aft ends of the harness. Straps 42 are connected to overhead chain 17 with long ropes 41. Two long shoulder straps 43 extend from the forward end of harness 40. The distal ends of shoulder straps 43 are also connected to chain 17 with long ropes 41. Two leg loops 45 are placed around the worker's thighs to provide support to the legs. Loops 45 are also connected to chain 17 by two additional ropes 41. As shown in FIGS. 4 and 4A, ropes 41 converge together so that their upper ends are connected together to a ring which serves as an attachment point and which is connected to the lower end of chain 17, the upper end of which is connected to a suspensory member at the top of frame 17. As shown, the combined lengths of the ropes and chain are almost as great as the 3-meter height of the frame so as to enable the worker to swing freely.

SUMMARY, RAMIFICATIONS, AND SCOPE

Accordingly the reader will see that I have provided an improved harvest machine with worker suspension slings. It positions workers in prone positions very close to low plants so that they may reach the plants without bending. It allows workers to swing about the slings to reach the plants and packing boxes or conveyor belt with great ease. It is very comfortable to the workers. It can be used with a motorized conveyor belt to deposit the produce into a packing box with great efficiency. It may be towed by a motor vehicle, or it may be fitted with its own motor such that it is self-propelled. It may be used with a boat such that it is self-guided along the rows of plants. It allows the workers back to remain straight at all times, thereby avoiding any back strain. All straps are preferably made adjustable by conventional means (not indicated). In lieu of leg loops, harness 40 can be lengthened so as to come down almost to the worker's knees, thereby to support the worker's legs.

While the above description contains many specificities, these should not be construed as limitations on the scope of the invention, but as exemplifications of the presently-preferred embodiments thereof. Many other ramifications and variations are possible within the teachings of the invention. For example, the dimensions, materials, and shapes of the components can be varied. Different numbers of slings (e.g., one to four or more) may be used. The slings may be height adjustable to suit plants of different types and sizes. The machine may be fitted with a seat and a steering wheel such that it may be piloted by driver.

Thus the reader is requested to determine the scope of the invention by the appended claims and their legal equivalents, and not by the examples given.

I claim:

1. A harvest machine for facilitating a manual harvesting operation, comprising:
   a chassis fitted with spaced wheels for enabling said chassis to be propelled in a forward direction along parallel rows of plants, conveying means on said chassis for automatically carrying produce into a packing means, said conveying means comprising a motorized conveyor belt,
   said chassis having a frame which includes an overhead harness suspension support member above said wheels for supporting movable worker suspension means,
   movable worker suspension means attached to said overhead harness suspension support member for suspending a worker in a prone position below said overhead harness suspension support member and for enabling said worker to swing about freely in a horizontal plane,
   said movable worker suspension means including a worker-carrying harness which includes an underbelly portion which extends under said worker's torso,
   said worker-carrying harness including at least two side elongated suspensory members which are attached to opposite sides of said underbelly portion and which extend upwardly at respectively opposite sides of said worker's torso,
   said two side elongated flexible suspensory members each having a bottom end and a top end, said bottom ends of said two side elongated suspensory members being spaced apart, when supporting a prone worker, in a sideways horizontal direction normal to said forward direction, by the width of said worker's torso,
   said two side elongated flexible suspensory members converging toward each other above said worker's position such that said upper ends of said two side elongated flexible suspensory members are substantially closer together, in said sideways direction, than the width of said worker's torso,
   said movable worker suspension means also including attachment means attaching said upper ends of said two side elongated flexible suspensory members to said overhead harness suspension support member above said worker's position,
   said attachment means also being substantially narrower, in said sideways direction, than the width of said worker's torso,
   the combined lengths of said side elongated flexible suspensory members and said attachment means being over two meters long,
   whereby said worker-carrying harness, and any worker carried in a prone position in said harness, will be able to swing freely and easily in said sideways direction so as to facilitate harvesting produce.

2. The harvest machine of claim 1 wherein said attachment means attaches said two side elongated flexible suspensory members to said overhead harness suspension support member at a single point.

3. The harvest machine of claim 1 wherein said two side elongated flexible suspensory members are attached together above said worker's position at a single point of attachment and said attachment means comprises a single elongated flexible member connecting said point of attachment to said overhead harness suspension support member at a single point.

4. The harvest machine of claim 3 wherein said a single elongated flexible member is a chain.

5. The harvest machine of claim 1, further including means for attaching said harvest machine to a towing vehicle.

6. The harvest machine of claim 1, further including propulsion means for propelling said harvest machine.

7. The harvest machine of claim 6 wherein said propulsion means comprises a motorized nose wheel.

8. The harvest machine of claim 1 wherein said underbelly portion of said worker-carrying harness comprises a rectangular, flexible sheet and said elongated flexible suspensory members comprise four elongated straps extending up, two from each side of said sheet.

9. The harvest machine or claim 8 wherein said worker-carrying harness also includes a pair of leg loops and a pair of elongated straps for suspending said loops from above.

10. A harvest machine for facilitating a manual harvesting operation, comprising:
    a chassis fitted with spaced wheels for enabling said chassis to be propelled in a forward direction along parallel rows of plants,
    said chassis having a frame which includes an overhead harness suspension support member above said wheels for supporting a worker-carrying harness, conveying means on said chassis for automatically carrying produce into a packing means, said conveying means comprising a motorized conveyor belt,
    movable worker suspension means attached to said overhead harness suspension support member for suspending a worker in a prone position and for enabling said worker to swing about freely in a horizontal plane,
    said movable worker suspension means comprising a worker-carrying harness which includes an underbelly portion which extends under said worker's torso,
    said worker-carrying harness including at least two side elongated flexible suspensory members which are attached to opposite sides of said underbelly portion and which extend upwardly at respectively opposite sides of said worker's torso,
    said two side elongated flexible suspensory members each having a bottom end and a top end, said bottom ends of said two side elongated flexible suspensory members being spaced apart, when supporting a prone worker, in a sideways horizontal direction, normal to said forward direction, by the width of said worker's torso,
    said two side elongated flexible suspensory members converging toward each other above said worker's position such that said upper ends of said two side elongated flexible suspensory members are attached together at a single point,
    said movable worker suspension means also including attachment means attaching said upper ends of said two side elongated flexible suspensory members to said overhead harness suspension support member above said worker's position, said attachment means comprising a single elongated flexible member connecting said point of attachment to said overhead harness suspension support member at a single point, the combined lengths of said side elongated flexible suspensory members and said attachment means being over two meters long, whereby said worker-carrying harness and any worker carried in a prone position in said harness, will be able to swing freely and easily in said sideways direction when harvesting produce.

11. The harvest machine of claim 10 wherein said side elongated flexible suspensory members comprise at least four flexible members, two on each side of said worker.

12. The harvest machine of claim 11 wherein said single elongated flexible member is a chain.

13. The harvest machine of claim 10, further including means for attaching said harvest machine to a towing vehicle.

14. The harvest machine of claim 10, further including propulsion means for propelling said harvest machine.

15. The harvest machine of claim 14 wherein said propulsion means comprises a motorized nose wheel.

16. The harvest machine of claim 10 wherein said underbelly portion of said worker-carrying harness comprises a rectangular, flexible sheet and said side elongated flexible suspensory members comprise four elongated straps extending up, two from each side of said sheet, and further including a pair of leg loops and a pair of elongated straps for suspending said loops from above.

* * * * *

UNITED STATES PATENT AND TRADEMARK OFFICE
CERTIFICATE OF CORRECTION

PATENT NO. : 5,322,409

DATED : June 21, 1994

INVENTOR(S) : Michael McCluney

It is certified that error appears in the above-indentified patent and that said Letters Patent is hereby corrected as shown below:

Column 2, line 64, change "feed" to --feet--.

Signed and Sealed this

Thirtieth Day of August, 1994

Attest:

BRUCE LEHMAN

Attesting Officer  Commissioner of Patents and Trademarks

UNITED STATES PATENT AND TRADEMARK OFFICE
Certificate

Patent No. 5,322,409                                               Patented: June 21, 1994

On petition requesting issuance of a certificate for correction of inventorship pursuant to 35 U.S.C. 256, it has been found that the above identified patent, through error and without anydeceptive intent, improperly sets forth the inventorship.

Accordingly, it is hereby certified that the correct inventorship of this patent is: Michael McCluney, La Selva Beach, CA; Timothy M. Driscoll, Capitola, CA.

Signed and Sealed this Fifth Day of December, 2000.

ROBERT P. OLSZEWSKI
*Supervisory Patent Examiner*
Art Unit 3652